UNITED STATES PATENT OFFICE.

GEORGE CHRISTOPHER AND RALPH WINNINGTON LEFTWICH, OF LONDON, ENGLAND.

TEA EXTRACT AND PROCESS OF MAKING THE SAME.

SPECIFICATION forming part of Letters Patent No. 425,982, dated April 22, 1890.

Application filed November 30, 1888. Serial No. 292,293. (No specimens.) Patented in England October 16, 1888, No. 14,877.

*To all whom it may concern:*

Be it known that we, GEORGE CHRISTOPHER, F. C. S., consulting chemist, and RALPH WINNINGTON LEFTWICH, M. D., physician, subjects of the Queen of England, residing at London, in England, have invented certain new and useful Improvements in the Preparation and Treatment of Extract of Tea, (for which we have obtained British Patent No. 14,877, of October 16, 1888,) of which the following is a specification.

In carrying out our invention we employ gelatine in the treatment of extract of tea for the purpose of the neutralization of tannin and the consequent prevention of the well-known prejudicial action due to tannin, which infusion of tea exercises on the digestive powers of the human system, and we have devised the following methods of effecting this purpose:

We take dry pulverized extract of tea and mix it intimately with dry gelatine reduced to a fine state of subdivision or in such other form as to readily dissolve in hot water, employing such proportions as are found most suitable for the particular kind of tea extract taken. These proportions should be such that on nearly-boiling water being poured on the mixture for the purpose of making a beverage of ordinary strength the mixture shall dissolve with the production of the smallest possible quantity of insoluble matter, care being taken at the same time that the beverage shall not be of a distinctly-glutinous nature. In order to secure these results, it is advisable to employ the extract from some kind of tea which, while strong in other respects, contains as little tannin as possible. With the employment of extract from good black tea we have found that if we take two parts of extract to one part of gelatine we have always got a very good result; but, owing to the variable proportion of tannin in tea, it is manifest that the relative proportions of gelatine and extract are subject to wide variation. With a suitable kind of tea extract on nearly-boiling water being poured upon the mixture, with stirring, we obtain a beverage which is almost perfectly clear, and on standing yields only an insignificant deposit. The larger the excess of gelatine employed above the quantity required merely to combine with a tannin the more perfectly will the tannate of gelatine be redissolved or kept in solution, but the greater the danger of the beverage assuming a glutinous character; hence the gelatine should be employed in the minimum quantity sufficient to produce a satisfactory result. It is essential that the solution should contain a distinct excess of gelatine, as shown on filtration, by its giving a precipitate with a solution of tannin and none with a solution of gelatine.

In order to secure a mixture of uniform color, the gelatine may be colored brown with some harmless substance, such as caramel; but this is not necessary if the gelatine is ground sufficiently fine.

The mixture obtained as above should be preserved in boxes or bottles closed as air-tight as practicable.

Instead of being in the state of powder, the mixture of gelatine and extract of tea may be put up in the form of lozenges in the following manner: The mixed powder of tea extract and gelatine described above is preferably mixed with a suitable quantity of powdered loaf-sugar to make it palatable, and the whole is then subjected to pressure and made up into lozenges according to well-known methods. The lozenges are lastly packed in well-closed boxes or bottles with, for example, powdered loaf-sugar to prevent adhesion. These lozenges are very useful on occasions on which a feeling of fatigue or drowsiness has to be resisted, since they possess a powerful stimulating effect on the nervous system without necessitating the trouble and inconvenience of preparing a strong infusion of tea, and also without any injurious action on the digestive system.

In order to render the gelatine more soluble and friable, it may be employed in the form of a combination with fine loaf-sugar prepared, for example, in the following manner: The gelatine is dissolved in hot water, the sugar added and allowed to dissolve, and the whole mixed together. This solution is then evaporated to dryness and the solid residue pulverized, according to methods well known to manufacturers of gelatine. The relative proportions of gelatine and sugar depend upon the precise character and properties which it is desired that the final mixture with tea extract shall possess; but we have found that equal parts give a very suitable compound. Instead of dissolving the gelatine the aqueous solution formed in the process of manufacture of this substance may be employed. This combination of gelatine with sugar is more especially suited for the manufacture of the lozenges in consequence of the large amount of sugar which they must almost necessarily contain; but we also find it very useful for simply mixing with the powdered extract, owing to its being susceptible of finer grinding than is the case with gelatine itself. If necessary, a little string-sirup may also be added to make the lozenges bind, and with the same object the gelatine itself or its combination with sugar may be employed in the form of a concentrated solution or jelly, no matter whether the whole or a part of the gelatine taken is in this condition. The extract of tea also may be in the form of a concentrated solution or sirupy liquid, but so concentrated that on being added to the gelatine or to the combination of gelatine and sugar the whole solidifies. In short, in the manufacture of the lozenges, care is taken so to regulate the consistency of the ingredients that the final mixture is ultimately a solid, although at a certain stage of preparation the mass may be more or less plastic in order to admit of being molded.

The tea extract alluded to hereinbefore is prepared by evaporating an infusion of tea to dryness (or, if rendered advisable by special circumstances, as alluded to above, not quite to dryness) in a copper vacuum-pan at the lowest practicable temperature, according to well-known methods. In order to prevent the possibility of the contamination of the extract with copper, the pan and all its fittings are heavily coated with tin wherever the infusion can come into contact with them.

Instead of being dried completely in the vacuum-pan, the extract may in many cases be preferably removed in a sirupy condition, transferred to a drying-room, and dried according to well-known methods.

The dry extract is ground in a mill constructed essentially like an ordinary corn-mill, except that the bearings, wherever they come into contact with the extract, are made of lignum-vitæ or silver, since the extract is affected prejudically by contact with iron. For the same reason all mixing machinery and all implements and vessels used are so made that contact with iron or steel is avoided, or where this is impracticable care is taken to keep the surfaces of the metal clean and bright.

The extract of tea treated in the manner set forth in this specification may be mixed or combined with any suitable substance that may be thought fit for the serving of special purposes.

In this specification and in the claims appended it should be understood that by the word "extract" we mean a dry extract or a concentrated liquid extract, from which by the addition of hot water a solution to serve as a beverage can be made, and not the ordinary infusion produced by pouring hot water upon the tea-leaves.

We are aware that it has been proposed to use gelatinous matter—such as gelatine, starch, gum, or starch-gum—in preparing tea and coffee for market; but such materials have been selected solely on account of their adhesive properties and used only as a coating or varnish to prevent the escape of the aroma from the article coated. We are also aware that tea and coffee have been coated as above described, either while in a divided or granulated condition or after being moistened and pressed into cakes or balls.

Our invention differs materially from the process above described. Instead of merely coating the raw material, we obtain an extract of the tea and mix intimately with such extract, either in a liquid or dry and finely-powdered form, a definite proportion of gelatine, the latter being used solely on account of its chemical properties, as has been heretofore stated.

What we claim is—

1. The herein-described process of preparing tea, consisting in making a dry extract thereof and combining gelatine with such extract, substantially as and for the purpose set forth.

2. The herein-described process of making a dry preparation of tea, consisting in making an extract thereof, mixing gelatine and sugar and drying the same, and then mixing the extract of tea and the combination of gelatine and sugar, substantially as set forth.

3. The herein-described preparation of tea, which consists of a dry extract of tea combined with gelatine, as set forth.

4. The herein-described dry preparation of tea, which consists of an extract of tea combined with gelatine and sugar, substantially as described.

In testimony whereof we have hereto set our hands in the presence of the two subscribing witnesses.

GEORGE CHRISTOPHER.
RALPH WINNINGTON LEFTWICH.

Witnesses:
HAROLD WADE,
PERCY K. WOODWARD.